US005720087A

United States Patent [19]

Rasmussen

[11] Patent Number: 5,720,087

[45] Date of Patent: Feb. 24, 1998

[54] METHOD FOR ASSEMBLING SLATS OF VENETIAN BLINDS AND MECHANISM FOR USE IN THE EXERCISE OF THE METHOD

[75] Inventor: Arly Rasmussen, Ryslinge, Denmark

[73] Assignee: A/S Chr. Fabers Fabriker, Ryslinge, Denmark

[21] Appl. No.: 464,877

[22] PCT Filed: Dec. 7, 1993

[86] PCT No.: PCT/DK93/00406

§ 371 Date: Jun. 28, 1995

§ 102(e) Date: Jun. 28, 1995

[87] PCT Pub. No.: WO94/15056

PCT Pub. Date: Jul. 7, 1994

[30] Foreign Application Priority Data

Dec. 29, 1992 [DK] Denmark ................................ 1569/92

[51] Int. Cl.[6] ................................ B23P 19/04

[52] U.S. Cl. ................................ 29/24.5

[58] Field of Search ................................ 29/24.5

[56] References Cited

U.S. PATENT DOCUMENTS 3,292,232 12/1966 Millsson ................................ 29/24.5
3,710,464 1/1973 Persson ................................ 29/24.5
5,099,556 3/1992 Lim ................................ 29/24.5
5,179,771 1/1993 Hebsgaard ................................ 29/24.5
5,349,730 9/1994 Anderson et al. ................................ 29/24.5

FOREIGN PATENT DOCUMENTS

0319190A2 11/1988 European Pat. Off. .
2 003 304 1/1970 Germany .

*Primary Examiner*—David P. Bryant
*Assistant Examiner*—Tisa Stewart
*Attorney, Agent, or Firm*—Jacobson, Price, Holman & Stern PLLC

[57] ABSTRACT

In the production of slat packages for Venetian blinds, the slats are placed over each other and introduced between a first and a second transverse band in double rungs in carrying bands or ladders including bands or cords. The slats are conveyed one by one to the carrying band and lifted after being introduced into a double rung to enable mechanical introduction of the slats between the double rungs. A double rung is stretched between two teeth projecting over the plane in which the slats are conveyed. A slat is conveyed forward until it has passed under the first of the two transverse bands, and the slat is then lifted so that when further conveyed it passes over the second of the two transverse bands. The slat can be lifted by an inclined plane placed between the teeth.

3 Claims, 5 Drawing Sheets

METHOD FOR ASSEMBLING SLATS OF VENETIAN BLINDS AND MECHANISM FOR USE IN THE EXERCISE OF THE METHOD

FIELD OF THE INVENTION

The present invention concerns a procedure for production of slat packages for Venetian blinds whose slats, placed over each other, are introduced between a first and a second transverse band in double rungs in carrying bands or ladders consisting of bands or cords, by which procedure the slats are conveyed one by one to the carrying band and lifted after being introduced into a double rung of the carrying band or ladder.

1. Background of the Invention

It is possible in order to ensure that the slats of a Venetian blind cannot turn round in the carrying bands to use carrying bands with two transverse bands in each rung, between which the slats are introduced. In principle, the introduction can take place in two ways, either by each slat being introduced directly between the two bands in each rung or by each slat being introduced after the two bands have been crossed in such a way that the lower band lies over the slat and the upper band lies under the slat.

2. Description of the Prior Art

From DE patent paper 2,003,304 a procedure is known where a carrying band with double ladder rungs is stretched between two rotary discs having recesses placed in the periphery. The distance between two successive pairs of recesses corresponds to the distance between two successive double rungs of the carrying ladder. Before a slat is introduced between the two bands of a rung, the bands are separated by means of special spreading devices, which are then placed in the conveying path of the slat. After the slat has been introduced, the spreading devices must be moved away from this conveying path. The known procedure thus requires a comparatively complicated equipment. Besides, it is not possible by the known procedure to introduce a slat into a rung whose transverse bands are twisted.

SUMMARY OF THE INVENTION

The purpose of the invention is to present a procedure which makes introduction of the slats by means of a simple and safe equipment possible. Furthermore, it must be possible to introduce the slats between twisted transverse bands.

This is achieved according to the invention in such a way that a double rung of ladder is stretched between two teeth projecting over the plane in which the slats are conveyed, that a slat is conveyed until it has passed under the first of the two transverse bands, and that the slat is then lifted so that when further conveyed it passes over the second of the two transverse bands.

The presented procedure can immediately be mechanized by means of an appropriate mechanism which moves and stretches the carrying band.

It is desirable that the slat, after being conveyed until it has passed under the first of the two transverse bands, is lifted by means of an inclined plane placed between the teeth. Hereby correct lifting of the slat is ensured in a very simple way.

It should be noted that the double rung can be stretched between the two teeth with the end of the carrying band that is uppermost in the finished slat package turning either towards or away from the conveyed slat. In the first case the slat will be introduced immediately between the two transverse bands. In the second case the slat will be introduced between twisted transverse bands.

As previously mentioned, the invention also concerns a mechanism for use in the exercise of the procedure and comprising protruding teeth between which a double rung of ladder can be stretched. According to the invention this mechanism comprises a rotary roller with pairs of teeth placed on the periphery, and where the distance between two successive pairs of teeth corresponds to the distance between two successive double rungs of a carrying ladder. The roller is turned a tooth every time an introduced slat is lifted free of the mechanism, so that the succeeding double rung is in the right place for the introduction of the succeeding slat.

BRIEF DESCRIPTION OF THE DRAWINGS

In the following the invention will be explained in more detail in connection with the drawing, where.

DETAILED DESCRIPTION OF THE PREFERRED EMBODIMENT

Figure 1:
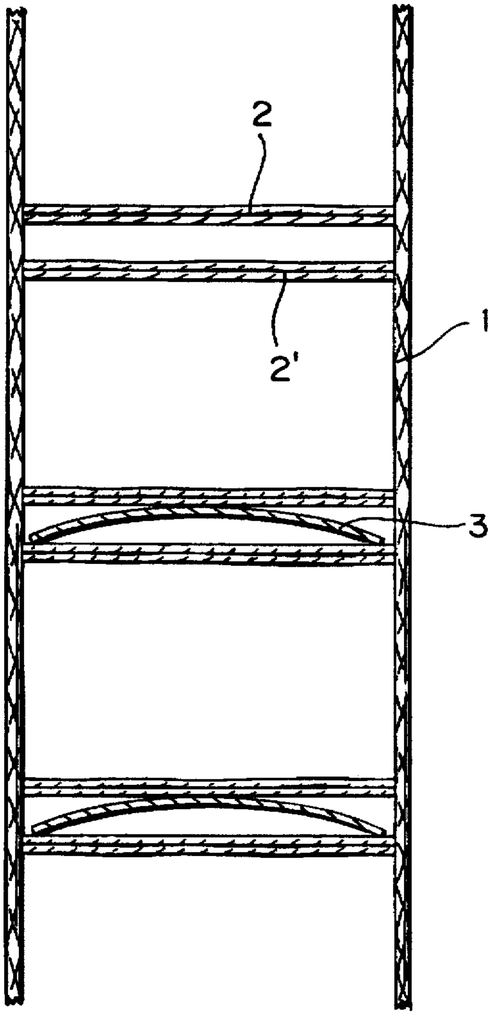
FIG. 1 is a schematic presentation of a carrying band for a Venetian blind with slats introduced between double rungs.
Figure 2:
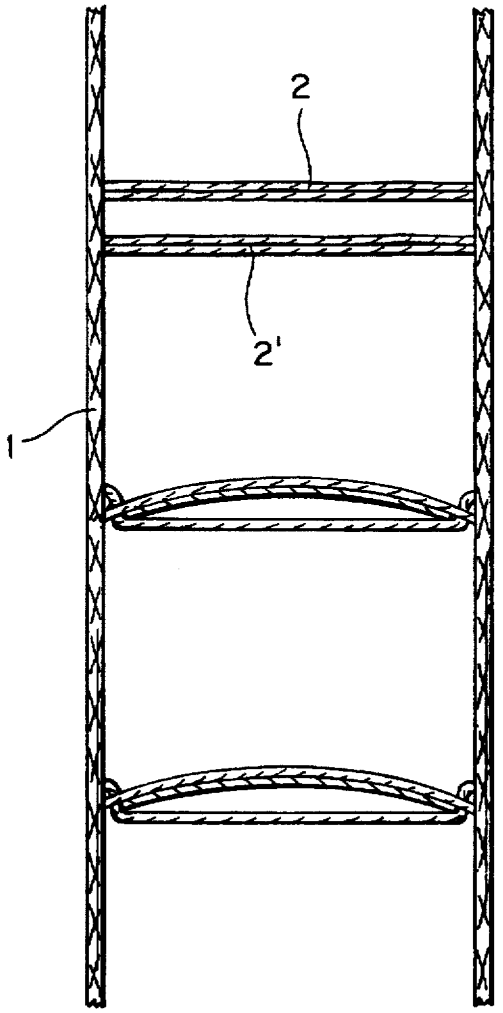
FIG. 2 shows the same, but with slats introduced between twisted transverse bands.

FIGS. 1 and 2 show in schematic form carrying bands with double rungs of ladder 2,2' and the Venetian blind slat 3, which has been introduced into a rung directly between its two transverse bands and between twisted transverse bands, respectively. The double rungs ensure that the slats cannot turn round in the carrying band.

Figure 3:
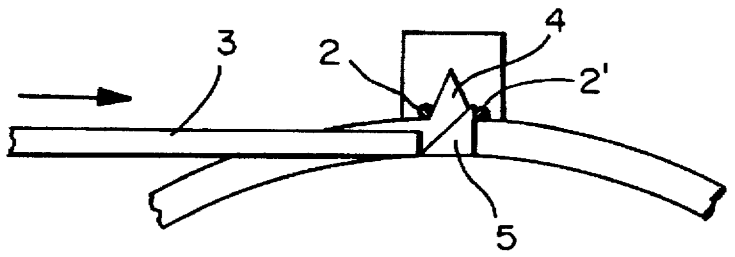
FIGS. 3–5 introduction of a slat into a double rung, schematically and seen from the side.
Figure 4:
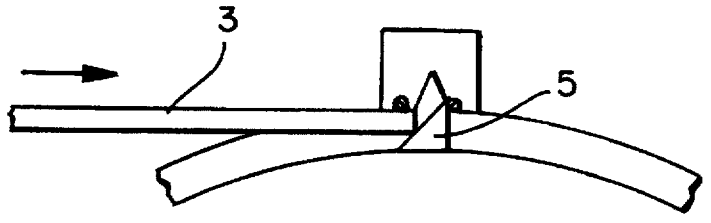
Figure 5:
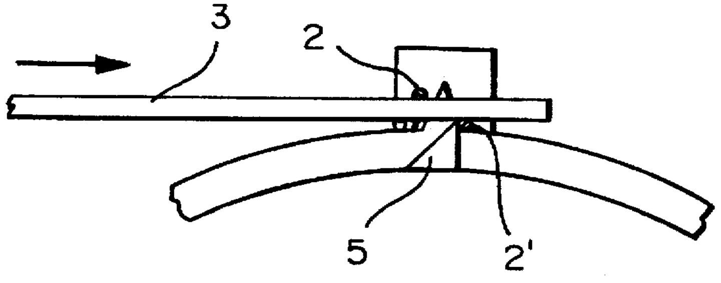

It appears from FIGS. 3–5 how slats 3 can be introduced mechanically one by one between the two transverse bands in a rung. A double rung 2,2' is stretched in such a way that the two transverse bands 2 and 2' are separated between two teeth 4 projecting over the plane in which the slat is being conveyed, see also FIGS 6–9. The slat 3 is moved forward until it has passed under the first of the two transverse bands 2 (FIG. 4). After that the slat is lifted, in the embodiment shown here by means of one or more inclined planes 5 placed between the teeth, so that when moved further forward the slat passes over the second of the two transverse bands 2'. After that the slats are lifted in an actually known way (FIG. 8) so that a succeeding slat can be introduced. Until that is done, the succeeding double rung is stretched between either the two above-mentioned teeth or between the succeeding teeth in a mechanism as shown in FIGS. 6–9.

The shown mechanism comprises a rotary roller with pairs of teeth placed on the periphery. The distance between two succeeding pairs of teeth corresponds to the distance between two succeeding double rungs. The roller is moved synchronously with the forward movement of the slats, so that the next rung of the ladder is in the right place when the next slat is moved forward.

Figure 6:
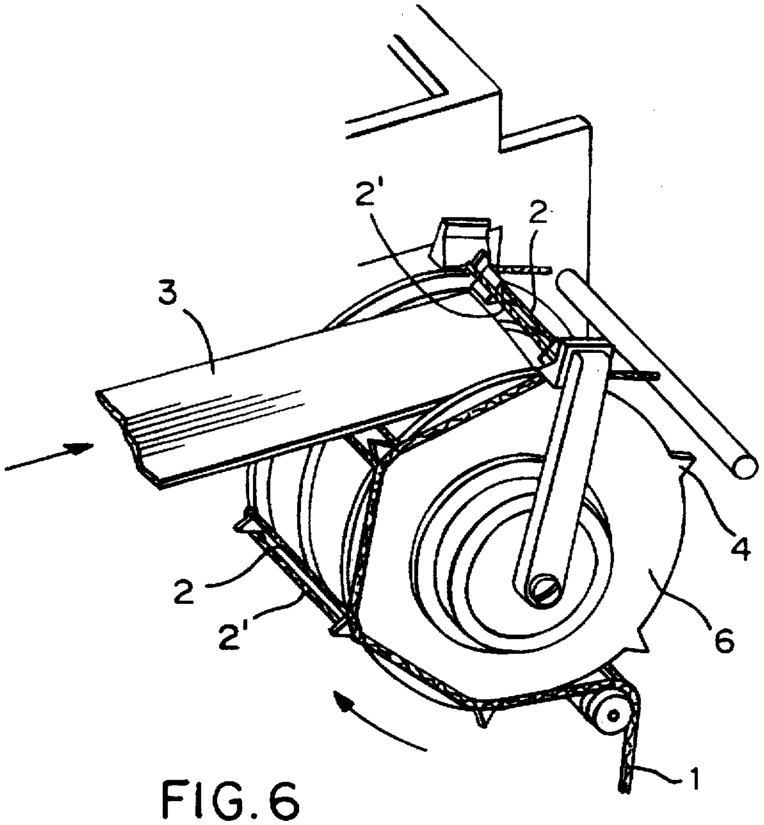
FIG. 6 in perspective a mechanism for use in connection with introduction of slats between twisted double transverse bands in a rung and a slat immediately before the introduction.
Figure 7:
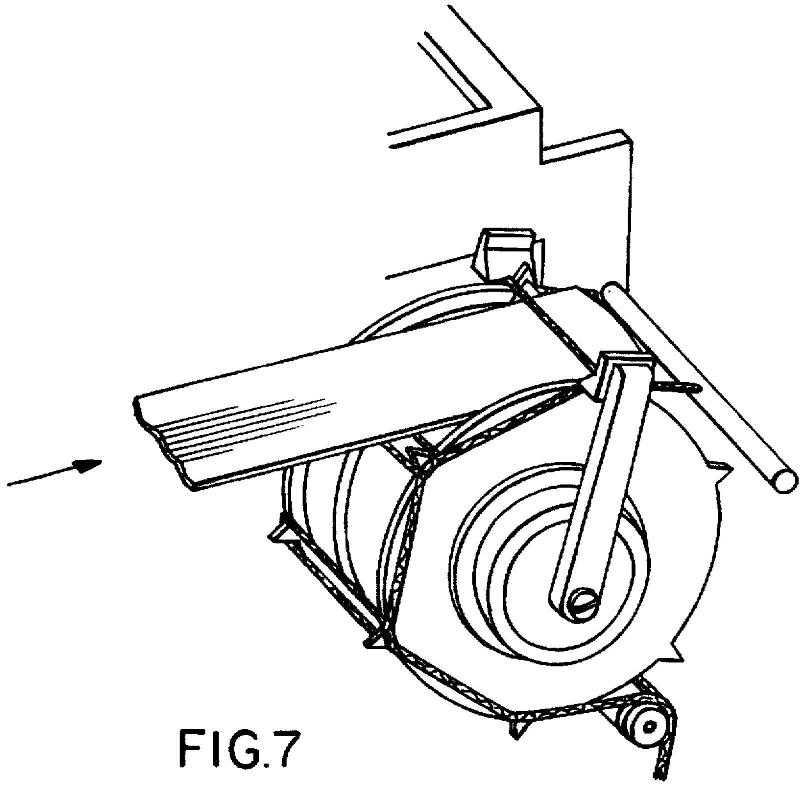
FIG. 7 the same after the slat has been introduced.
Figure 8:
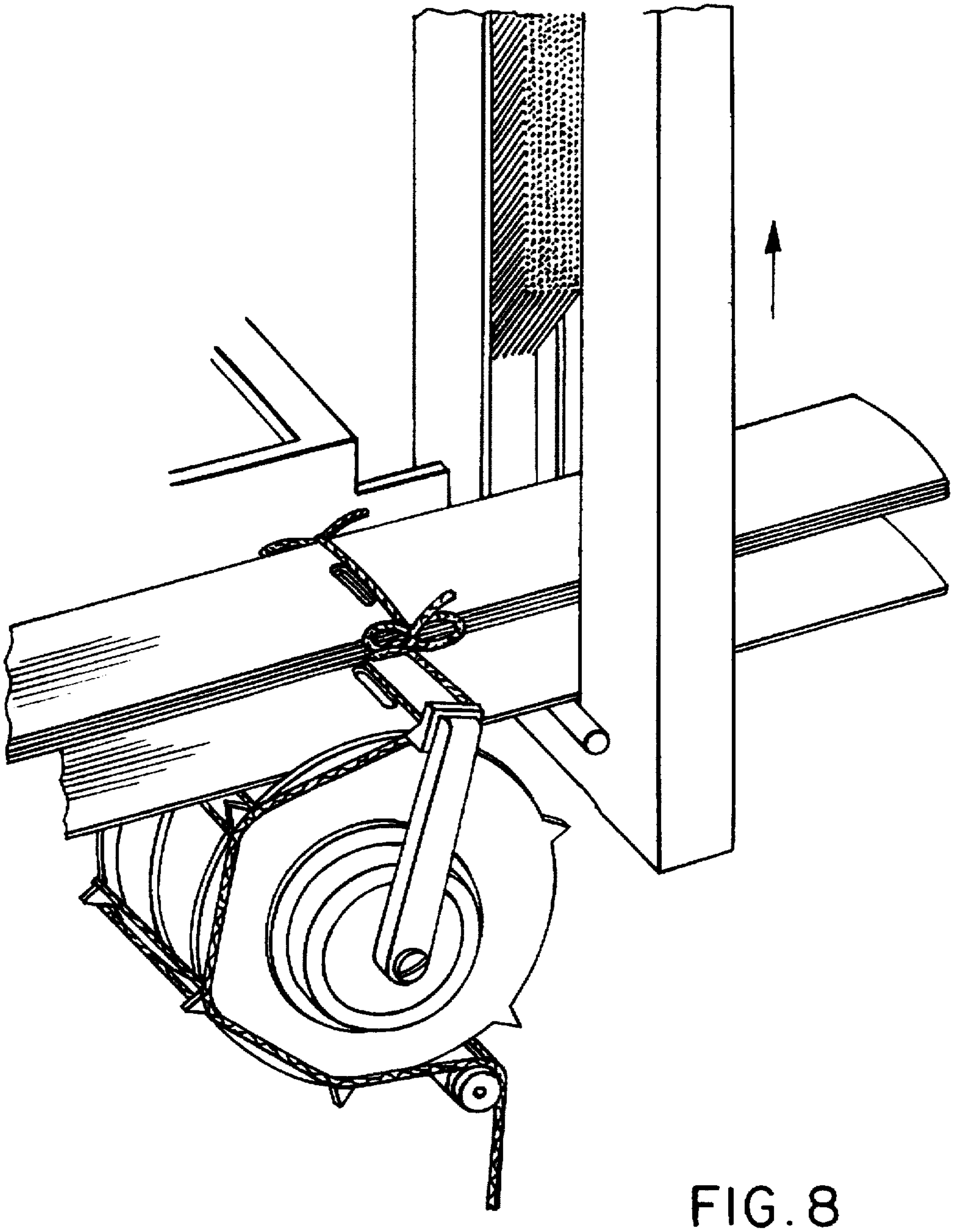
FIG. 8 in perspective a part of a slat packing machine with a mechanism according to FIGS. 6 and 7.
Figure 9:
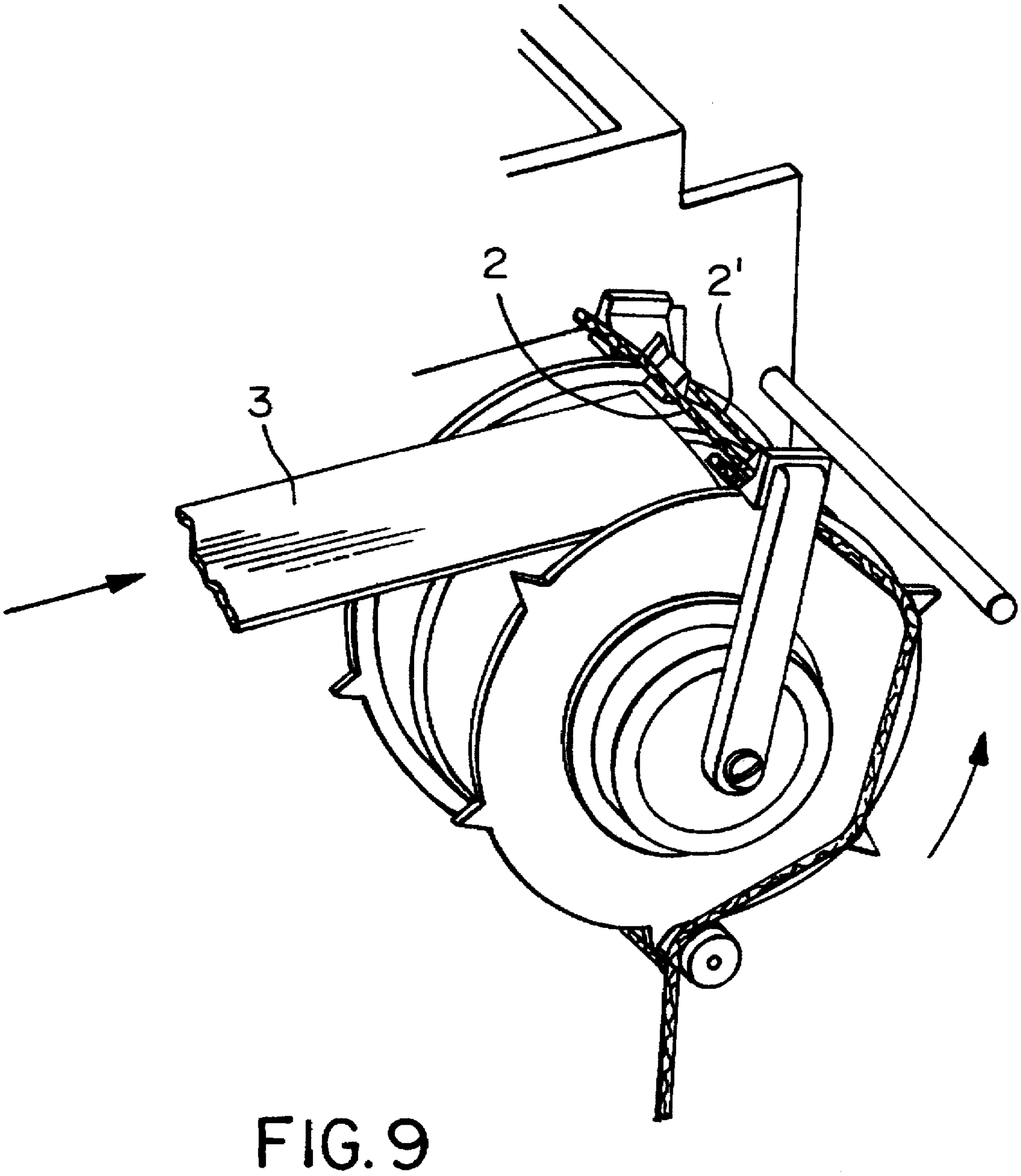
FIG. 9 the mechanism shown in FIG. 6, but for use in connection with introduction of slats immediately between the two transverse bands in a rung.

If the roller is turned as indicated by the arrow in FIG. 6, (in a clockwise direction) the introduction of the slats shown in FIG. 2 is achieved by introducing slat 3 under trailing band 2' and then over leading band 2 to form the twisted bands of FIG. 2. If the roller is turned as indicated by the arrow in FIG. 9 (in a clockwise direction), the introduction of the slats shown in FIG. 1 by introducing slat 3 under trailing band 2 and then over trailing band 2' to form the non-twisted transverse bands of FIG. 1 is acheived.

What is claimed is:

1. An apparatus for inserting slats for Venetian blinds between pairs of transverse bands in carrying bands or ladders including bands or cords, said apparatus comprising:

a rotary roller having transversely arranged pairs of teeth projecting from a periphery thereof for entraining the carrying bonds or ladders about a periphery of the rotary roller, a distance between two succeeding pairs of teeth corresponding to a distance between two succeeding pairs of transverse bands in a carrying band or ladder for separating the two transverse bands of a pair of transverse bands by said pair of teeth, conveying means for conveying the slats one by one to an insertion zone at the roller in a first conveying plane so that a slat is first passed under one of the transverse bands of said pair of transverse bands, lifted into a second conveying plane above the first conveying plane, and then passed over the other transverse band of said pair of transverse bands, lifting means for carrying the inserted slats away from the insertion zone, and an inclined plane located on said rotary roller between each pair of the transversely arranged teeth, said inclined plane lifting the slats from the first conveying plane to the second conveying plane.

2. An apparatus according to claim 1, wherein the roller is rotatable in either direction.

3. An apparatus according to claim 2, wherein said carrying band or ladder is supplied from below said roller and removed from above said roller so that when the transverse bands of said carrying band or ladder are in engagement with said pairs of teeth on the periphery of said roller, rotating in an upward direction, then the direction of rotation of the roller determines whether the slats, which are being conveyed to the insertion zone from one and the same direction along the conveying plane, are inserted between twisted or non-twisted, respectively, transverse bands of the carrying band or ladder.

* * * * *